United States Patent [19]
Brown et al.

[11] Patent Number: 5,255,939
[45] Date of Patent: Oct. 26, 1993

[54] MECHANISM FOR OPERATIVELY CONNECTING SEAT BELT WEBBING TO A TRACK IN A VEHICLE

[75] Inventors: Louis R. Brown, Oxford; Steven R. Loxton, Marysville, both of Mich.

[73] Assignee: TRW Vehicle Safety Systems Inc., Lyndhurst, Ohio

[21] Appl. No.: 963,065

[22] Filed: Oct. 19, 1992

[51] Int. Cl.5 ............................................. B60R 22/06
[52] U.S. Cl. ................................... 280/804; 280/802; 280/808
[58] Field of Search ................ 280/804, 803, 802, 808

[56] References Cited
U.S. PATENT DOCUMENTS

| | | | |
|---|---|---|---|
| 3,842,929 | 10/1974 | Wada et al. | 280/804 |
| 4,256,332 | 3/1981 | Takada | 280/804 |
| 4,274,658 | 6/1981 | Takata | 280/803 |
| 4,417,751 | 11/1983 | Packington | 280/804 |
| 4,437,683 | 3/1984 | Moriya et al. | 280/804 |
| 4,741,555 | 5/1988 | Frantom et al. | 280/804 |

Primary Examiner—Eric D. Culbreth
Attorney, Agent, or Firm—Tarolli, Sundheim & Covell

[57] ABSTRACT

A mechanism connects seat belt webbing to a track of a passive seat belt system of a vehicle. The mechanism comprises a slider slidably engageable with the track. A webbing anchor link includes a first flat portion pivotally connected to the slider and a second flat portion having an opening through which the belt webbing extends. The slider and the first flat portion of the anchor link are pivotally connected in a manner to enable the anchor link to pivot about mutually perpendicular intersecting axes relative to the slider. The first flat portion lies in a first plane and has a first longitudinal axis lying in the first plane. The second flat portion lies in a second plane and has a second longitudinal axis lying in the second plane. The first and second longitudinal axes extend parallel with each other. The first and second planes form between them a predetermined angle. Preferably, the predetermined angle is an angle of 45°.

8 Claims, 3 Drawing Sheets

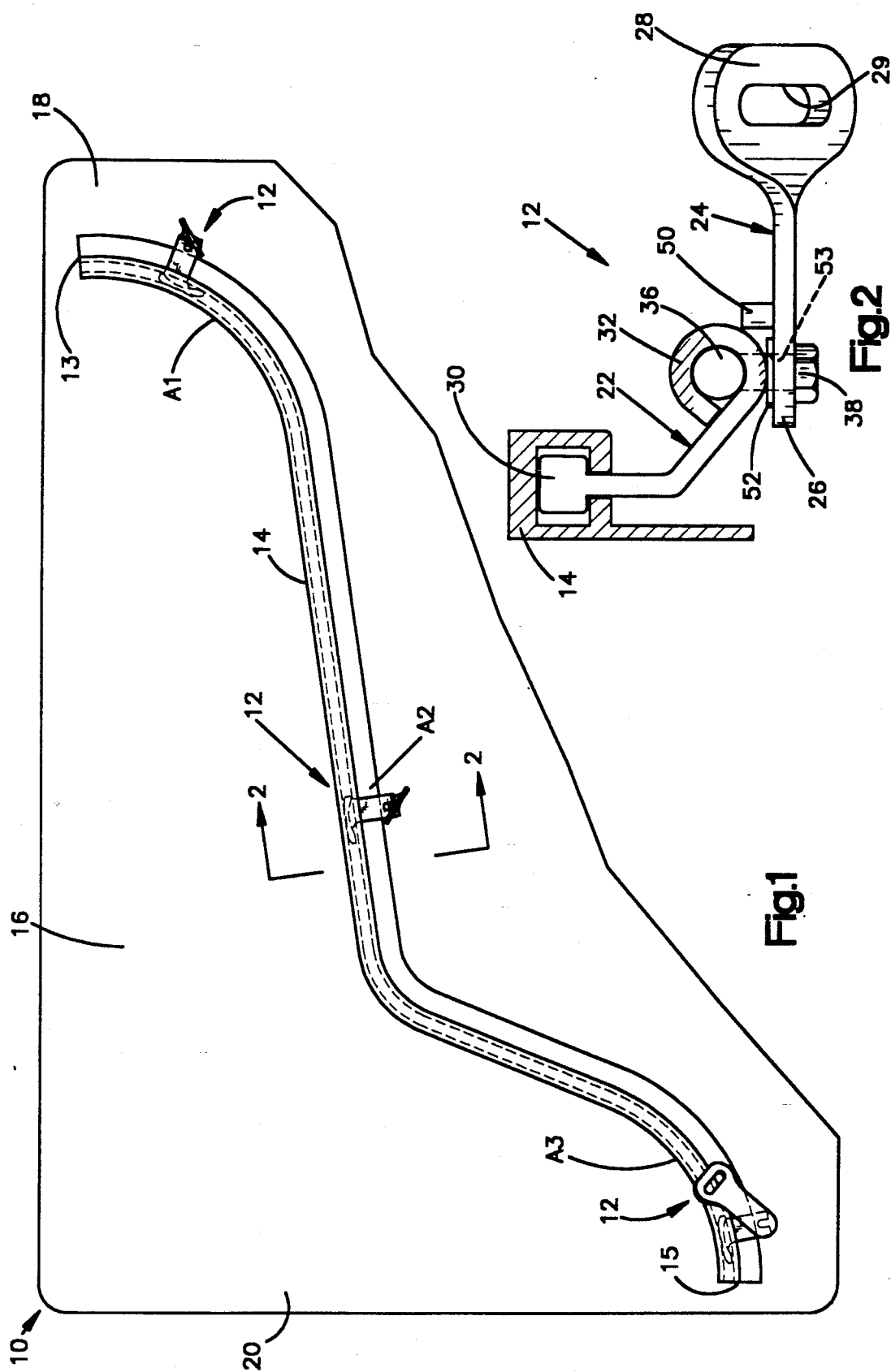

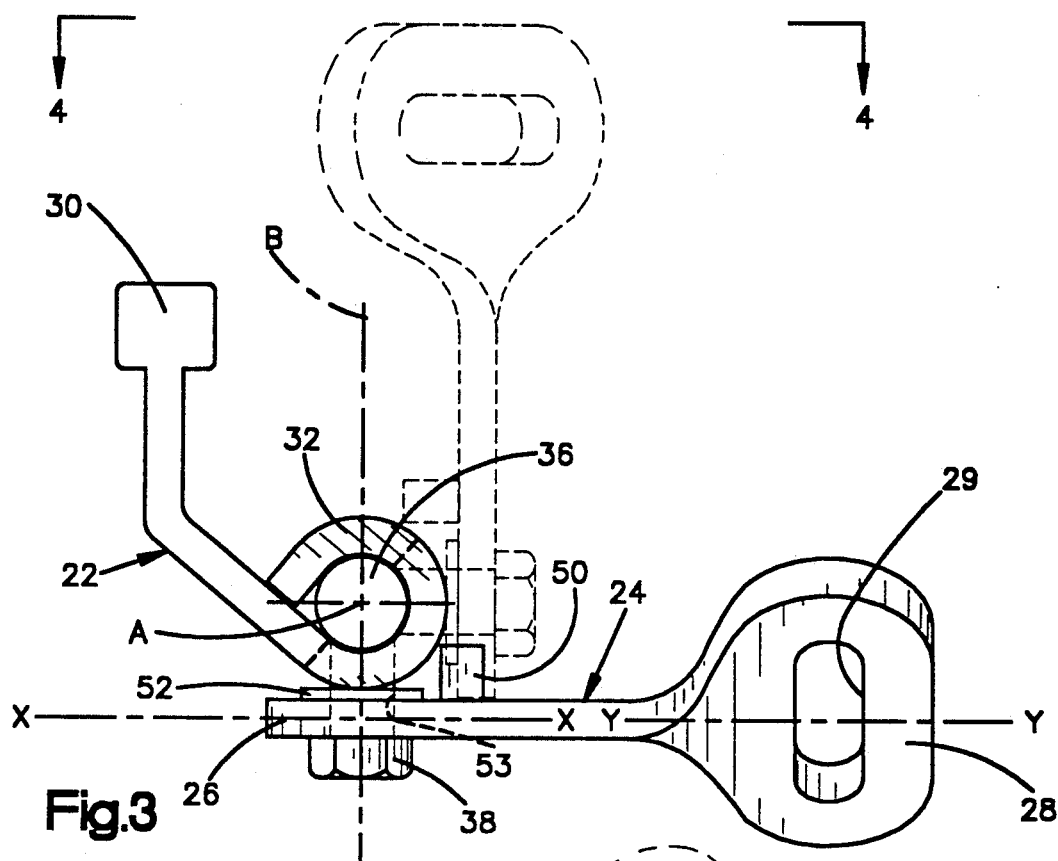
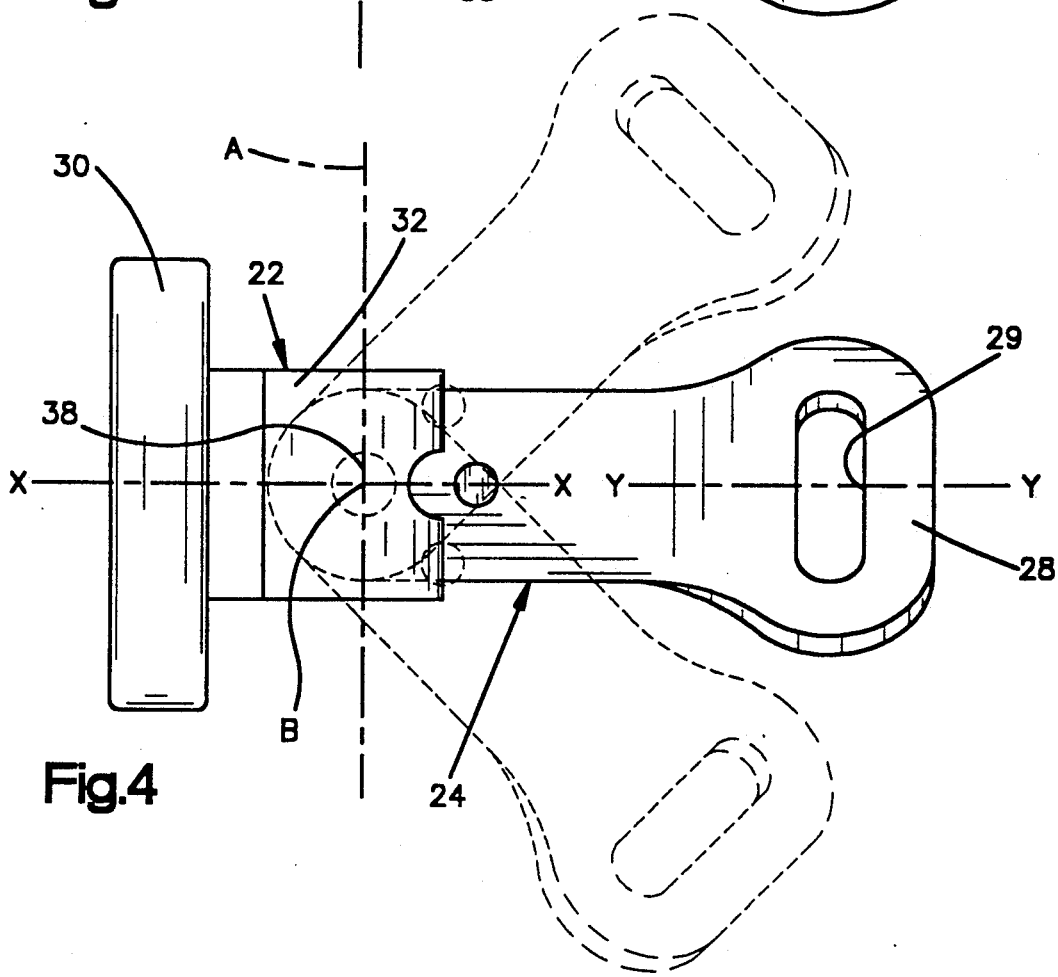

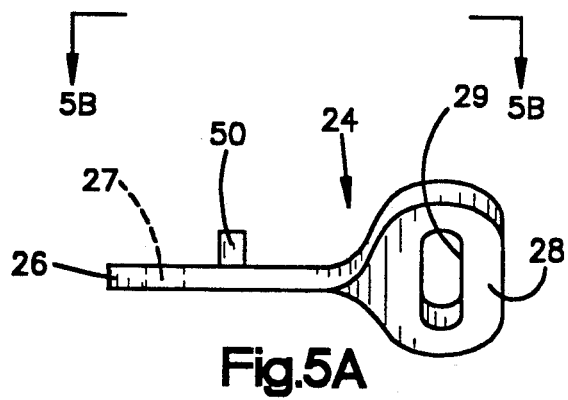
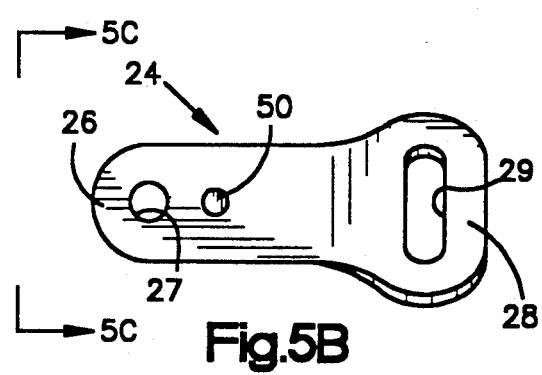
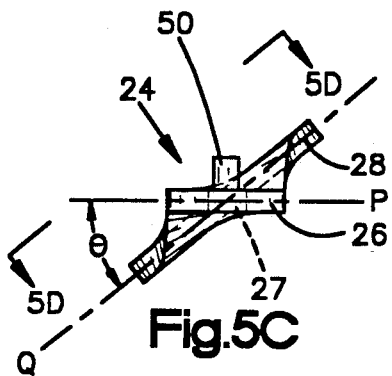
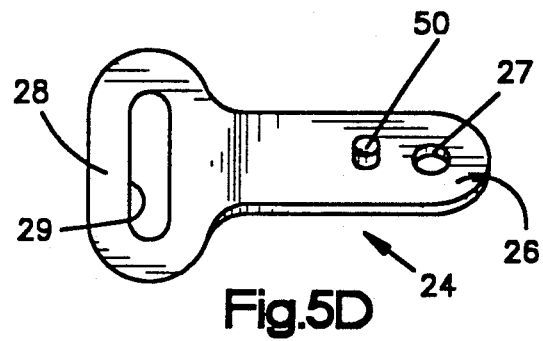
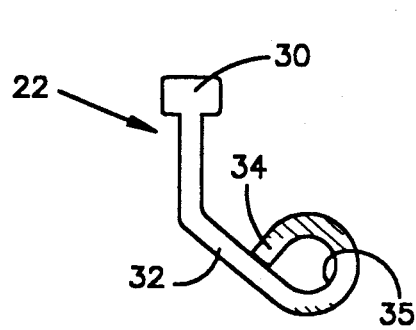
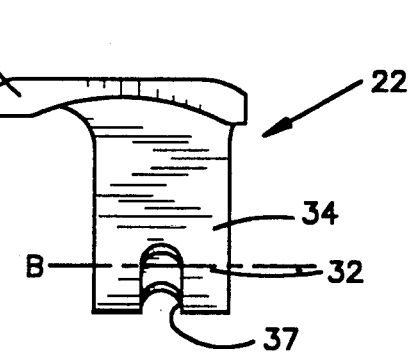
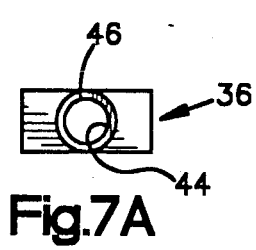
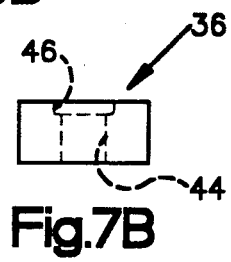
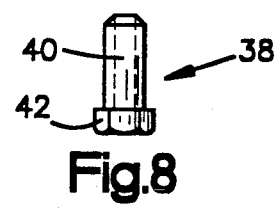

MECHANISM FOR OPERATIVELY CONNECTING SEAT BELT WEBBING TO A TRACK IN A VEHICLE

BACKGROUND OF THE INVENTION

1. Technical Field

The present invention relates to a passive seat belt system for a vehicle, and is particularly directed to a mechanism that is attached to seat belt webbing and is slidably movable along a track in the vehicle.

2. Background Art

Passive seat belt systems for use in vehicles are well known. A typical passive seat belt system includes a track and a mechanism slidably movable along the track. The mechanism is attached to seat belt webbing. As the mechanism moves along the track, the seat belt webbing is moved toward or away from an occupant of the vehicle. When the mechanism is at one end of the track, the belt webbing is applied against the occupant to restrain the occupant. When the mechanism is at the other end of the track, the belt webbing is spaced away from the occupant.

The track along which the mechanism slidably moves typically has portions of different inclinations. A problem associated with known passive seat belt systems is that the belt webbing has a tendency to roll as the mechanism slidably moves between track portions having different inclinations. Rolling of the belt webbing as the mechanism slidably moves along the track is undesirable because the belt webbing may be applied against the occupant in a rolled condition.

SUMMARY OF THE INVENTION

In accordance with the present invention, a mechanism connects seat belt webbing to a track of a passive lap belt system of a vehicle. The mechanism comprises a slider for slidably engaging the track. The slider is movable between opposite ends of the track. An anchor link is connected to the seat belt webbing and the slider. The anchor link includes a first flat portion connected to the slider and a second flat portion having an opening which receives the belt webbing. The first flat portion of the anchor link is pivotally connected to the slider to enable the anchor link and the slider to pivot relative to each other. The first flat portion of the anchor link is preferably pivotally connected to the slider to enable the anchor link to pivot about mutually perpendicular intersecting axes relative to the slider.

The slider includes a shoe portion slidably engageable with the track and a collar portion. A pivot pin extends through an opening in the collar portion. The anchor link is connected by a bolt to the pivot pin. The bolt extends perpendicular to the pivot pin. The anchor link is pivotable about a longitudinal central axis of the bolt. The central axis of the bolt corresponds to the one of the mutually perpendicular intersecting axes. The anchor link is also pivotable about the longitudinal central axis of the pivot pin. The central axis of the pivot pin corresponds to the other one of the mutually perpendicular intersecting axes.

The first flat portion of the anchor link lies in a first plane, and the second flat portion of the anchor link lies in a second plane. The first and second flat portions of the anchor link are twisted relative to each other. Therefore, the first and second planes have a predetermined angle between them. Preferably, the predetermined angle is an angle of 45°.

By enabling the anchor link to pivot about mutually perpendicular intersecting axes relative to the slider and by having the first and second flat portions of the anchor link lie in first and second planes that are preferably oriented at a 45° angle with each other, rolling of the belt webbing is minimized as the slider moves between the opposite ends of the track.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein:

FIG. 1 is a schematic illustration of a passive lap belt system incorporating a mechanism constructed in accordance with the present invention;

FIG. 2 is a sectional view of the passive seat belt system illustrated in FIG. 1, taken along line 2—2 of FIG. 1;

FIG. 3 is an enlarged view of the mechanism illustrated in FIG. 2;

FIG. 4 is a view taken in the direction of line 4—4 of FIG. 3;

FIGS. 5A–5D are different views of a webbing anchor link which is a part of the mechanism of FIGS. 3 and 4;

FIGS. 6A and 6B are different views of a slider which is a part of the mechanism of FIGS. 3 and 4;

FIGS. 7A and 7B are different views of a pivot pin which is a part of the mechanism of FIGS. 3 and 4; and FIG. 8 is a view of a bolt which is a part of the mechanism of FIGS. 3 and 4.

DESCRIPTION OF PREFERRED EMBODIMENT

A vehicle passive seat belt system 10 is schematically illustrated in FIG. 1. The seat belt system 10 includes a curved track 14 disposed in a vehicle door 16. The track 14 extends between a front portion 18 of the vehicle door 16 and a rear portion 20 of the vehicle door 16. One end 13 of the track 14 is at the front portion 18 of the vehicle door 16 and the other end 15 of the track 14 is at the rear portion 20 of the vehicle door 16. An end portion A1 of the track 14 is located adjacent the end 13 of the track 14. Another end portion A3 of the track 14 is located adjacent the end 15 of the track 14.

A central portion A2 of the track 14 is located between the opposite end portions A1, A3 of the track 14. As shown in FIG. 1, the end portion A1 of the track 14 is curved and inclined with respect to the central portion A2 of the track 14. Also, the end portion A3 of the track 14 is curved and inclined with respect to the central portion A2 of the track 14.

A mechanism 12 is slidably engageable with the track 14 and is slidably movable between the opposite ends 13, 15 of the track 14. The mechanism 12 is connected with one end of a seat belt webbing (not shown). The other end of the seat belt webbing is operatively wound around a spool of a spring-loaded seat belt retractor (not shown) in a known manner. A spring in the seat belt retractor provides a biasing force which acts on the seat belt webbing to create tension in the seat belt webbing.

To facilitate describing the present invention, the mechanism 12 is shown in solid lines in FIG. 1 at each of the three portions A1, A2, A3 of the track 14. When the mechanism 12 is at the end portion A1 of the track 14, the seat belt webbing is spaced away from the occupant. When the mechanism 12 is at the end portion A3 of the track 14, the seat belt webbing is against the occupant to restrain movement of the occupant.

Referring to FIGS. 2-8, the mechanism 12 comprises a slider 22 (FIGS. 6A and 6B) and a webbing anchor link 24 (FIGS. 5A to 5D) pivotally connected to the slider 22 as shown in FIGS. 3 and 4. The anchor link 24 includes a first flat portion 26 through which a hole 27 extends and a stop pin 50 located adjacent to the hole 27. The anchor link 24 also includes a second flat portion 28 having an oval-shaped opening 29 through which the seat belt webbing (not shown) extends.

The first flat portion 26 of the anchor link 24 lies in a first plane P (FIG. 5C) and has a first longitudinal axis X (FIGS. 3 and 4) lying in the first plane P. The second flat portion 28 of the anchor link lies in a second plane Q (FIG. 5C) and has a second longitudinal axis Y (FIGS. 3 and 4) lying in the second plane Q. The first and second longitudinal axes X, Y extend parallel with each other and are coaxial with each other, as shown in FIGS. 3 and 4.

Also, as best shown in FIG. 5C, the first and second planes P, Q have a predetermined angle Θ between them. Preferably, the predetermined angle Θ is 45°. Thus, the second flat portion 28 of the anchor link 24 may be described as being twisted about the longitudinal axes X, Y at an angle of 45° relative to the first flat portion 26 of the anchor link 24.

The slider 22 includes a shoe portion 30 that is slidably engaged with the track 14, as shown in FIGS. 1 and 2. The slider 22 also includes a collar portion 32 that is connected to the first flat portion 26 of the anchor link 24 as shown in FIGS. 3 and 4. One end 34 of the collar portion 32 is curled around to form a passage 35 (FIG. 6A). The collar portion 32 has an arcuate-shaped slot 37 (FIG. 6B) located in the center of the end 34 of the collar portion 32.

The mechanism 12 further includes a pivot pin 36 (FIGS. 7A and 7B) and a bolt 38 (FIG. 8). The pivot pin 36 is located in the passage 35 of the collar portion 32. The bolt 38 (FIG. 8) has a threaded portion 40 and a head portion 42 attached to the threaded portion 40. The pivot pin 36 has a threaded opening 44 that receives the threaded portion 40 of the bolt 38 and a countersunk portion 46 at one end of the threaded opening.

The threaded portion 40 of the bolt 38 extends through the hole 27 in the first flat portion 26 of the anchor link 24 and through a hole 53 of a plastic washer 52 (FIGS. 2 and 3). The plastic washer 52 is located between the first flat portion 26 of the anchor link 24 and the collar portion 32 of the slider 22. The bolt 38 also extends through the slot 37 of the collar portion 32. The threaded portion 40 of the bolt 38 is screwed into the threaded opening 44 of the pivot pin 36.

The pivot pin 36 has a longitudinal central axis A (FIGS. 3 and 4) that extends through the pivot pin 36. The bolt 38 has a longitudinal central axis B that extends through the bolt 38. The longitudinal central axis B of the bolt 38 extends transverse to the longitudinal central axis of the pivot pin 36. The pivot pin 36 and the bolt 38 enable the anchor link 24 to pivot about mutually perpendicular intersecting axes relative to the slider 22. More specifically, the longitudinal central axis A of the pivot pin 36 corresponds to one of the mutually perpendicular intersecting axes. The longitudinal central axis B of the bolt 38 corresponds to the other one of the mutually perpendicular intersecting axes.

The anchor link 24 is pivotable about the longitudinal central axis A of the pivot pin 36 between a down position and an up position. In the down position, the anchor link 24 projects generally horizontally into the passenger compartment (shown in solid lines in FIG. 3). In the up position (shown in broken lines in FIG. 3), the anchor link 24 extends generally in a vertical plane. When the anchor link 24 pivots about the longitudinal central axis A of the pivot pin 36 between its up and down positions, the pivot pin 36 rotates about its longitudinal central axis A relative to the collar portion 32. In addition, the bolt 38 moves between the ends of the arcuate-shaped slot 37 when the anchor link 24 pivots about the longitudinal central axis A of the pivot pin 36 between its up and down positions.

The anchor link 24 is also pivotable about the longitudinal central axis B of the bolt 38 between two extreme side positions. One extreme side position of the anchor link 24 is shown in broken lines at the top of FIG. 4 and is hereinafter referred to as the extreme right side position. The other extreme side position of the anchor link 24 is shown in broken lines at the bottom of FIG. 4 and is hereinafter referred to as the extreme left side position. The anchor link 24 shown in solid lines in FIG. 4 is in a centered position.

The pivoting movement of the anchor link 24 about the longitudinal central axis B of the bolt 38 is independent of the pivoting movement of the anchor link 24 about the longitudinal central axis A of the pivot pin 36. The plastic washer 52 damps vibrational noise and enables the anchor link 24 and the slider 22 to move easily relative to each other. The anchor link 24 and the slider 22 move easily relative to each other because of the relatively low frictional characteristics of the plastic washer 52.

Operation of the mechanism 12 should be understood from the above. Initially, assume the vehicle door 16 is closed and the vehicle ignition is off. When the vehicle door 16 is closed and the vehicle ignition is off, the mechanism 12 is at the end portion A1 of the track 14 adjacent the front portion 18 of the vehicle door 16. When the mechanism 12 is at the end portion A1 shown in FIG. 1, the slider 22 and the anchor link 24 are in a position relative to each other such that the anchor link 24 projects generally horizontally into the passenger compartment of the vehicle. Specifically, the anchor link 24 is generally in the down position about the axis A (shown in solid lines in FIG. 3) and is generally in the centered position about the axis B (shown in solid lines in FIG. 4). More specifically, the anchor link 24 is approximately five degrees away from the centered position towards the extreme left side position about the axis B.

When the vehicle door 16 is opened to allow occupant ingress, the mechanism 12 remains at the end portion A1 of the track 14. After occupant ingress, the vehicle door 16 is closed. The mechanism 12 continues to remain at the end portion A1 after the vehicle door 16 is closed.

When the vehicle ignition is turned on, a motor (not shown) actuates to move the slider 22 and the anchor link 24 in a known manner from the end portion A1 of the track 14 towards the central portion A2. As the slider 22 and the anchor link 24 move from the end portion A1 towards the central portion A2 shown in FIG. 1, the anchor link 24 pivots slightly relative to the slider 22. Specifically, the anchor link 24 pivots slightly about the longitudinal central axis B from a position that is five degrees away from a centered position to its centered position (shown in solid lines in FIG. 4) as the anchor link 24 moves from the end portion A1 to the central portion A2 shown in FIG. 1. The anchor link 24 pivots relative to the slider 22 because of the tension in the seat belt webbing due to the biasing force of the spring in the seat belt retractor.

When the mechanism 12 is at the central portion A2 of the track 14, the anchor link 24 projects generally horizontally into the passenger compartment of the vehicle. Specifically, the anchor link 24 is generally in the down position about the axis A (shown in solid lines in FIG. 3) and the centered position about the axis B (shown in solid lines in FIG. 4). Also, when the mechanism 12 is at the central portion A2, the slider 22 and the anchor link 24 are located slightly above the thighs of the occupant. When the mechanism 12 is at the central portion A2 of the track 14, the belt webbing is just about to be applied against the occupant.

After the slider 22 and the anchor link 24 reach the central portion A2 of the track 14, the slider 22 and the anchor link 24 continue to move towards the end portion A3 shown in FIG. 1. As the slider 22 and the anchor link 24 continue to move from the central portion A2 towards the end portion A3, the anchor link 24 continues to pivot relative to the slider 22. The pivoting results from the tension in the seat belt webbing due to the biasing force of the spring in the seat belt retractor. More specifically, the anchor link 24 pivots about the longitudinal central axis A from the down position (shown in solid lines in FIG. 3), projecting generally horizontally into the passenger compartment, to the up position (shown in broken lines in FIG. 3), extending generally in a vertical plane. The upper end of slot 37 in the slider 22 limits the extent of pivotal movement of the anchor link 24 and bolt 38 about the axis A to approximately 90°.

As the anchor link 24 pivots about the axis A, the anchor link 24 also pivots about the longitudinal central axis B from its centered position (shown in solid lines in FIG. 4) to the extreme right side position (shown in broken lines at the top of FIG. 4). By pivoting the anchor link 24 about the mutually perpendicular axes A, B and by having the second flat portion 28 of the anchor link 24 twisted about the longitudinal axes X, Y at an angle of 45° relative to the first flat portion 26 of the anchor link 24, rolling of the belt webbing is minimized. Thus, as the mechanism 12 moves from the central portion A2 to the end portion A3, the belt webbing is applied in a flat condition against the occupant to restrain the occupant.

It should be apparent that the slider 22 and the anchor link 24 go through a controlled pivotal rotation about the axis A and a controlled pivotal rotation about the axis B as the mechanism 12 moves between the end 13 of the track 14 and the end 15 of the track 14. Preferably, the extent of controlled pivotal rotation about the axis A is approximately 90° as the mechanism 12 moves between the end 13 of the track 14 and the end 15 of the track 14. The extent of controlled pivotal rotation about the axis B is, preferably, approximately 70° as the mechanism 12 moves between the end 13 of the track 14 and the end 15 of the track 14.

In the event of a belt webbing jam or occupant interference with movement of the belt webbing, the extent of controlled pivotal rotation about the axis A between the slider 22 and the anchor link 24 cannot be forced to exceed 90°. Likewise, the extent of controlled pivotal rotation about the axis B between the slider 22 and the anchor link 24 cannot be forced to exceed 90°. By controlling the extent of pivotal rotation about the axes A and B between the slider 22 and the anchor link 24 in the manner as just described rolling of the belt webbing is controlled. Such rolling is minimized as the mechanism 12 moves between the end 13 of the track 14 and the end 15 of the track 14.

From the above description of the present invention, those skilled in the art to which the present invention relates will perceive improvements, changes and modifications. Such improvements, changes and modifications are intended to be covered by the appended claims.

Having described the invention, the following is claimed:

1. A mechanism for connecting seat belt webbing to a track of a passive belt system of a vehicle, said structure comprising:

a slider for slidably engaging the track;

an anchor link including a first portion pivotally connectable to said slider and a second portion having an opening for receiving belt webbing, said first portion of said anchor link being flat and said second portion of said anchor link being flat, said first flat portion lying in a first plane and having a first longitudinal axis lying in said first plane, said second flat portion lying in a second plane and having a second longitudinal axis lying in said second plane, said first and second longitudinal axes extending coaxial with each other, said first and second planes having a predetermined angle between them; and means for pivotally connecting said first portion of said anchor link to said slider to enable said anchor link to pivot about mutually perpendicular intersecting axes relative to said slider.

2. A mechanism according to claim 1 wherein said predetermined angle is an angle of 45°.

3. A mechanism for connecting seat belt webbing to a track of a passive belt system of a vehicle, said structure comprising:

a slider for slidably engaging the track;

an anchor link including a first portion pivotally connectable to said slider and a second portion having an opening for receiving belt webbing;

said slider including a shoe portion slidably engageable with the track and a collar portion pivotally connectable to said first portion of said anchor link; and means for pivotally connecting said first portion of said anchor link to said slider to enable said anchor link to pivot about mutually perpendicular intersecting axes relative to said slider.

4. A mechanism according to claim 3 wherein said means for pivotally connecting includes a pivot pin having a longitudinal central axis, said slider being operatively connected by said pivot pin to said first portion of said anchor link, said anchor link being pivotable about the longitudinal central axis of said pivot pin which corresponds to one of said mutually perpendicular intersecting axes.

5. A mechanism according to claim 4 wherein said means for pivotally connecting further includes a bolt having a longitudinal central axis which extends transverse to the longitudinal central axis of said pivot pin, said slider being operatively connected by said bolt to said first portion of said anchor link, said anchor link being pivotable about the longitudinal central axis of said bolt which corresponds to the other one of said mutually perpendicular intersecting axes.

6. A mechanism for connecting seat belt webbing to a track of a passive belt system of a vehicle, said structure comprising:
   a slider for slidably engaging the track, said slider being movable between opposite ends of the track;
   an anchor link including a first flat portion pivotally connectable to said slider and a second flat portion having an opening for receiving belt webbing, said first flat portion of said anchor link lying in a first plane and having a first longitudinal axis lying in said first plane, said second flat portion of said anchor link lying in a second plane and having a second longitudinal axis lying in said second plane, said first and second longitudinal axes extending parallel with each other, said first and second planes having a predetermined angle between them; and
   means for pivotally connecting said first flat portion of said anchor link to said slider to enable said anchor link to pivot relative to said slider;
   said slider including a shoe portion slidably engageable with the track and collar portion pivotally connectable to said first flat portion of said anchor link.

7. A mechanism for connecting seat belt webbing to a track of a passive belt system of a vehicle, said structure comprising:
   a slider for slidably engaging the track, said slier being movable between opposite ends of the track;
   an anchor link including a first flat portion pivotally connectable to said slider and a second flat portion having an opening for receiving belt webbing, said first flat portion of said anchor link lying in a first plane and having a first longitudinal axis lying in said first plane, said second flat portion of said anchor link lying in a second plane and having a second longitudinal axis lying in said second plane, said first and second longitudinal axes extending parallel with each other, said first and second planes having a predetermined angle between them; and
   means for pivotally connecting said first flat portion of said anchor link to said slider to enable said anchor link to pivot relative to said slider, said means for pivotally connecting comprising means for enabling said anchor link to pivot about mutually perpendicular intersecting axes relative to said slider;
   said means for pivotally connecting including a pivot pin having a longitudinal central axis, said slider being operatively connected through said pivot pin to said first portion of said anchor link, said anchor link being pivotable about the longitudinal central axis of said pivot pin which corresponds to one of said mutually perpendicular intersecting axes.

8. A mechanism according to claim 7 wherein said means for pivotally connecting further includes a bolt having a longitudinal central axis which extends transverse to the longitudinal central axis of said pivot pin, said slider being operatively connected through said bolt to said first portion of said anchor link, said anchor link being pivotable about the longitudinal central axis of said bolt which corresponds to the other one of said mutually perpendicular intersecting axes.

* * * * *

UNITED STATES PATENT AND TRADEMARK OFFICE
CERTIFICATE OF CORRECTION

PATENT NO. : 5,255,939

DATED : October 26, 1993

INVENTOR(S) : Louis R. Brown and Steven R. Loxton

It is certified that error appears in the above-indentified patent and that said Letters Patent is hereby corrected as shown below:

Column 7, line 31, change "slier" to --slider--.

Signed and Sealed this

Tenth Day of May, 1994

Attest:

BRUCE LEHMAN

Attesting Officer

Commissioner of Patents and Trademarks